OR 4,057,325

United States Patent [19]
Kondo

[11] 4,057,325
[45] Nov. 8, 1977

[54] DISPLAY DEVICE

[75] Inventor: Kenichi Kondo, Tokyo, Japan

[73] Assignee: Kabushiki Kaisha Daini Seikosha, Japan

[21] Appl. No.: 681,516

[22] Filed: Apr. 29, 1976

[30] Foreign Application Priority Data

May 1, 1975 Japan .................................. 50-52832

[51] Int. Cl.² .............................................. G02F 1/13
[52] U.S. Cl. .............................. 350/160 LC; 340/336
[58] Field of Search ............ 350/160 LC; 340/324 M, 340/336

[56] References Cited
U.S. PATENT DOCUMENTS 3,907,405  9/1975  Fukai et al. .................... 350/160 LC
3,921,162  11/1975 Fukai et al. ................ 350/160 LC X Primary Examiner—John K. Corbin
Assistant Examiner—Rolf Hille Attorney, Agent, or Firm—Robert E. Burns; Emmanuel J. Lobato; Bruce L. Adams

[57] ABSTRACT

A temperature compensating display device including a display operated by driving signals. A temperature detecting circuit periodically develops an oscillatory output signal having a frequency representative of ambient temperature, and the oscillatory signal is applied to a divider circuit for dividing the same. A selecting circuit receives the divided signal representative of ambient temperature and develops an oscillatory signal having a duty cycle representative of ambient temperature. A drive control circuit receives the selecting circuit output signal and voltage signals for developing driving signals and applying the driving signals to drive the display with the voltages at duty cycles corresponding to the duty cycles of the selecting circuit output signals. Accordingly, variations in driving voltages applied to the display compensate for ambient temperature variations, and this compensation is adjusted periodically each time the temperature detecting circuit develops its oscillatory output signal.

2 Claims, 10 Drawing Figures

DISPLAY DEVICE

BACKGROUND OF THE INVENTION

This invention relates to a display device in which driving time is controlled by a change of the ambient temperature.

A display element, for example, liquid crystal display device has a slow response at a low ambient temperature, and has a fast response at a higher ambient temperature. Therefore, a necessary driving voltage for operating said display element is changed according to the ambient temperature as indicated in FIG. 1 which illustrates the characteristics of temperature - driving voltage. Accordingly a minimum driving voltage for driving a display element becomes higher at a lower temperature, a on the contrary said minimum driving voltage for driving display element becomes lower at a higher temperature. A high driving voltage is necessary for operating the display element from the lower temperature to the higher temperature.

However, in case of driving the display element in a multiple system, the phenomenon of cross talk occurs at the higher driving voltage whereby it is necessary to develop and use the special display element for the multiplex system, and therefore the upper limit of the driving voltage is restricted.

Accordingly, there is a mutual relation as indicated by the curved line II in FIG. 1 between the maximum driving voltage and temperature of the display element whereby the cross-talk is more than a predetermined level.

When the driving voltage for the display element is set to $e$ V in FIG. 1, the temperature range of display with good contrast and having no cross-talk is set between TIC° and TIIC°. Namely the good contrast is not obtained at less than TIC°, the cross-talk occurs above TIIC°.

The curved line I and II in FIG. 1 are changed by the driving time of the display element namely the duty ratio or duty cycle of the driving pulse. For a large duty ratio, the curved lines $a$ and $b$ are moved downward, and on the contrary for a small duty ratio, said curved lines $a$ and $b$ are moved upward. Therefore, setting a large duty ratio of the driving pulse in a constant driving voltage causes the minimum and maximum temperature at become lower, on the contrary, setting a small duty ratio causes said minimum and maximum temperature to become higher.

SUMMARY OF THE INVENTION

Therefore, according to the present invention, the driving time of the display element is changed in accordance with the ambient temperature, setting the long width of the driving time at the lower temperature in which the response speed is delayed thereby providing compensation thereof. In the high temperature in which the response speed is fast, the width of the driving time is shortened whereby the occurrence of cross-talk is stopped. Therefore it is an object to obtain the display device for operating a liquid crystal element with good contrast over wide range of temperature. Further the display device of the present invention is preferable for applying to a digital electronic watch.

DESCRIPTION OF THE PREFERRED EMBODIMENT

Figure 2:
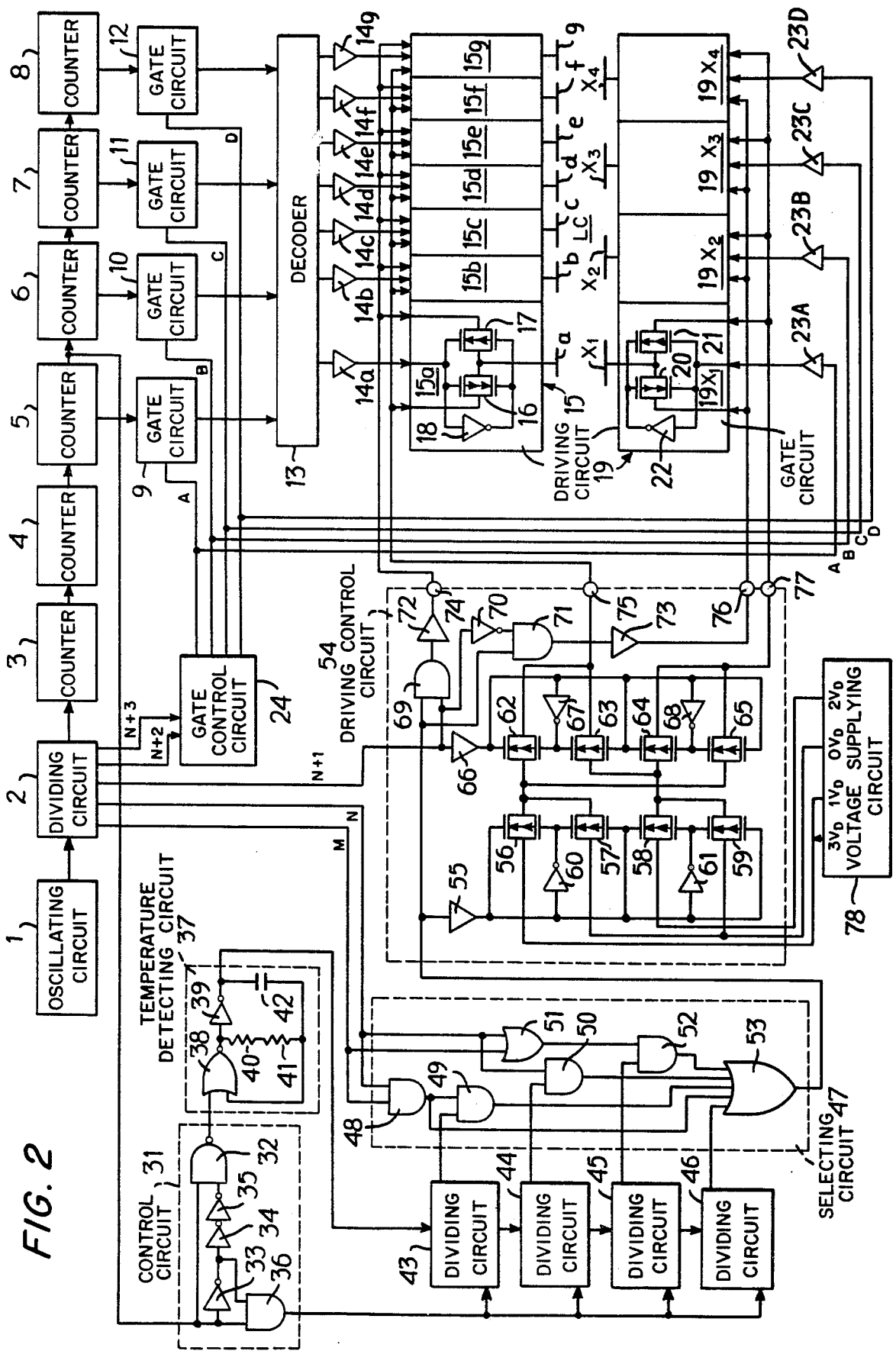
FIG. 2 is the circuit diagram showing an embodiment of the display device according to this invention.

Referring now to the embodiment of the present invention illustrated in the accompanying drawings in which:

FIG. 2 shows one embodiment of the present invention, wherein numeral 1 is an oscillating circuit having a quartz vibrator for developing oscillating signal divided by the dividing circuit 1 composed of a plurality of dividers. A 1 Hz signal is generated from said dividing circuit and is applied to a second-counter composed of 10-counter 3 and 6-counter 4. The output signal of said second-counter is applied to a minute-counter composed of 10-counter 5 and 6-counter 6, and the output signal of said minute-counter is applied to an hour-counter composed of 10-counter 7 and 2-counter 8.

The counting contents of said counters 5 – 8 are applied to the gate-circuits 9, 10, 11 and 12 which are cyclically switched by the control signal of the gate control circuit 24 in a time sharing system. The counting contents of the counters 5 – 8 are changed in the time sharing system by the gate circuits 9 – 12 and are applied to the decoder 13 whereby said counting contents are changed to the preferable code for driving a liquid crystal display device having 7-segments. In the illustrated embodiment, there are four sets of alphanumeric segment $a - g$ and four figure electrodes $X_1$, $X_2$, $X_3$ and $X_4$ respectively located relative to said segment $a - g$. However only a pair of segments $a - g$ are indicated, further said segments in each set are respectively and commonly connected.

The output of the decoder 13 is amplified by the amplifiers $14a - 14g$ and is applied to the driving circuit 15 having the gate-circuits $15a - 15g$ respectively corresponding to said segments $a - g$. Said gate circuits $15a - 15g$, as indicated in the detailed $15a$, are composed of the two transmission gates 16 and 17 and the one inverter 18. P-channel gate of said transmission gate 16 and N-channel gate of said transmission gate 17 are respectively connected, and the output signal of said decoder 13 amplified by the amplifiers 14a – 14g is applied, the to N-channel gate and P-channel gate of said transmission gates 16 and 17 via inverter 18. The output signal of the driving control circuit 54 is applied to the input terminal of said transmission gates 16 and 17.

The output terminals of said transmission gates 16 and 17 are commonly connected and are respectively connected to said segments a – g. The driving circuit 19 for driving said figure electrodes $X_1 - X_4$ of said liquid crystal display device LC has respectively the gate circuits $19X_1 - 19X_4$ corresponding to said figure electrodes $X_1 - X_4$. Said gate circuits $19X_1 - 19X_4$, as indicated in detailed embodiment $19X_1$, are composed of two transmission gates 20 and 21 and one inverter 22. N-channel gate of said transmission gate 20 is connected to P-channel gate of said transmission gate 21, and the output signals of the amplifiers 23A – 23D for amplifying the gate control signals A – D from the gate control circuit 24 are applied to said gate circuit 19. P-channel gate of said transmission gate 20 is connected to N-channel gate of said transmission gate 21, and the output of said amplifiers 23A – 23D are applied to said gate circuit 19 via said inverter 22.

Further the output signal from the driving control circuit is applied to the input terminal of said transmission gates 20 and 21. The output terminals of said transmission gates 20 and 21 are commonly connected and are connected to said figure electrodes $X_1 - X_4$.

Figure 3:
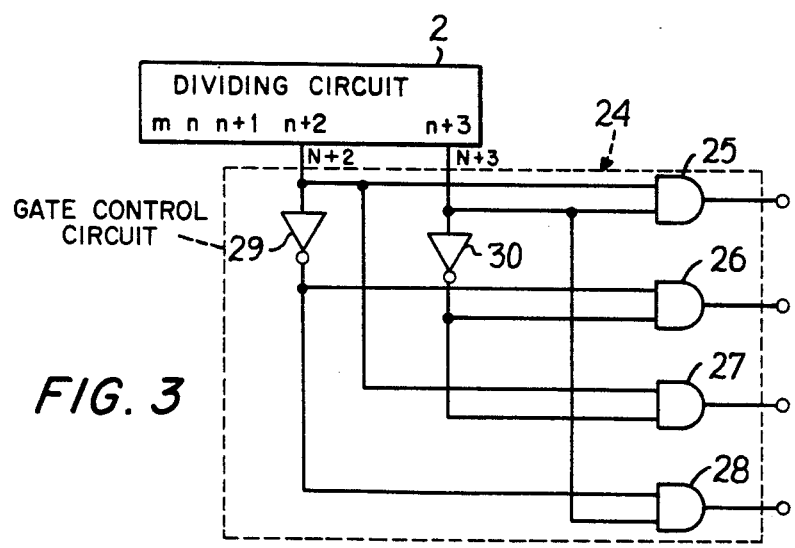
FIG. 3 is a circuit diagram showin an embodiment of the gate control circuit in FIG. 2.
Figure 4:
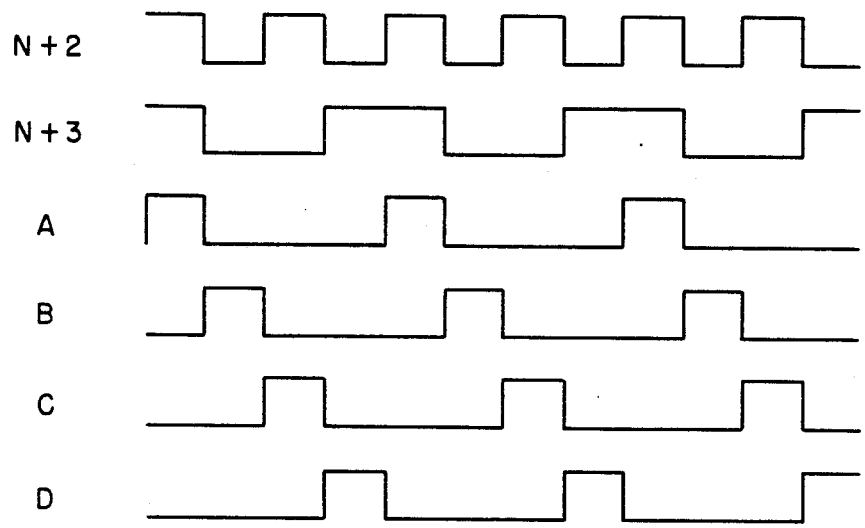
FIG. 4 is the waveform of the gate control signal derived from the output terminal of the gate control circuit.

The gate control circuit 24, as indicated in FIG. 3, cyclically generates four kinds of control signals A, B, C and D having ¼ duty ratio, a period equal to the period of the dividing signal N+3 and the phase shift between signals which corresponds to the pulse width of the dividing signal N+2. Said gate control circuit 24 has four AND-circuits 25, 26, 27 and 28. The dividing signals N+2 and N+3 are applied to said AND-circuit 25, the dividing signal N+2 inverted by the inverter 29 and the dividing signal N+3 inverted by the inverter 30 are applied to said AND-circuit 26, the dividing signal N+2 and the dividing signal N+3 inverted by the inverter 30 are applied to said AND-circuit 27, and further the dividing signal N+2 and N+3 inverted by said inverter 29 are applied to said AND-circuit 28. The wave shape of the dividing signal N+2 and N+3 and the gate control signals A – D generated from AND-circuits 25 – 28 are shown in FIG. 4.

Numeral 31 is the control circuit having the input signal of the output signal of 10-counter 5 in said minute counter. The control circuit 31 has the NAND-circuit 32 and the AND-circuit 36, and said output signal is applied to the one input terminal of said NAND-circuit 32, while the delayed output signal via the inverters 33, 34 and 35 is applied to the other input terminal of said NAND-circuit 32. The output signal of said inverter 33 is applied to the one input terminal of said AND-circuit 36, and the output signal of said counter 5 is applied to the other input terminal of said AND-circuit 36.

The output of said control circuit 31 is generated from said NAND-circuit 32 and AND-circuit 36, and the output of said NAND-circuit 32 is applied to the temperature detecting circuit 37. Said temperature detecting circuit 37 is composed of the multi-vibrator having the NOR-circuit 38, inverter 39, resistor 40, thermister 41 for detecting temperature (such as one having the trade mark of "POSISTOR") and condenser, the oscillating frequency thereof is determined by the resistance value of said resistor 40 and thermister 41 and capacitance of said condenser 42. Said thermister 41 has positive resistance-temperature characteristics, so that the time-constant becomes smaller at a lower temperature whereby the oscillating frequency of said detecting circuit 37 becomes higher. On the contrary said time-constant becomes larger at a higher temperature whereby the oscillating frequency becomes lower. Said temperature detecting circuit 37 operates only when a zero level control signal [0] is generated from said NAND-circuit 32 of said control circuit 31.

The oscillating output signal of said temperature detecting circuit 37 is applied to the first dividing circuit 43 of a plurality of dividing circuits 43, 44, 45 and 46. The outputs of said dividing circuits 43 – 46 become the gate signal of the selecting circuit 47, and said dividing circuits 43 – 47 are reset by a one level signal [1] generated from said AND-circuit 36 of said control circuit 31. Said selecting circuit 47 is composed of the AND-circuit 48 to which the signal M and N are applied, the AND-circuit 49 to which the outputs of the dividing circuit 43 and AND-circuit 48 are applied, the AND-circuit 50 to which the signal N and the output of said dividing circuit 44 are applied, the OR-circuit 51 to which the signals M and N are applied, the AND-circuit 52 to which the outputs of the dividing circuit 45 and the OR-circuit 51 are applied and the OR-circuit 53 to which are applied the outputs of the AND-circuits 48, 49, 50 and 52 and dividing circuit 46. The output of said selecting circuit 47 is generated from the output side of the OR-circuit 53 and is applied to the driving control circuit 54.

Said driving control circuit 54 has the amplifier 55 for amplifying the output of said selecting circuit 47, the output of the amplifier 55 is applied to the N-channel gate of the transmission gates 56 and 58 and the P-channel gate of the transmission gates 57 and 59, and is applied to the P-channel gate of the transmission gate 56 via inverter 60 and the N-channel gate of the transmission gate 57, and further applied to the P-channel gate of the transmission gate 58 via inverter 61 and the N-channel gate of the transmission gate 59.

The voltage 1VD generated from the voltage supplying circuit 78 is applied to the input terminal of the transmission gate 56, the voltage 0VD is applied to the input terminal of the transmission gates 57 and 59, the voltage 2VD is applied to the input terminal of the transmission gate 58. The output terminals of the transmission gates 56 and 57 are commonly connected, and are connected to the input terminals of the transmission gates 62 and 65. Further the output terminals of the transmission gates 58 and 59 are commonly connected, and are connected to the input terminals of the transmission gates 63 and 64. The dividing signal N+1 generated from the dividing stage N+1 of said dividing circuit 2 is applied to the N-channel gates of the transmission gates 62 and 64 and the P-channel gates of the transmission gates 63 and 65 via the amplifier 66, the output of said amplifier 66 is applied to the P-channel gate of the transmission gate 62 and the N-channel gate of the transmission gate 63 via the inverter 67, further the output of said amplifier 66 is applied to the P-channel gate of the transmission gate 64 and the N-channel gate of the transmission gate 65 via the inverter 68.

Said driving control circuit 54 has the AND-circuit 69 to which the dividing signal N+1 and of the selecting circuit 47 are applied, the AND-circuit 71 to which the output signal of the selecting circuit 47 and the inverted dividing signal N+1 are applied, the amplifier 72 for amplifying the output of the AND-circuit 69 and the amplifier 73 for amplifying the output of the AND-circuit 71. The output side of the amplifier 72 is connected to the terminal 74, the output terminals of the transmission gates 62 and 63 are connected to the terminal 75, the output side of the amplifier 73 is connected to the terminal 76, and the output terminals of the transmission gates 64 and 65 are connected to the terminal 77. The terminals 74 - 77 are the output terminals for the driving control circuit 54, the signal generated from the terminal 74 is applied to the input terminal of the transmission gate 17 of the gate-circuits 15a - 15g comprising the driving circuit 15, the output signal from the terminal 75 is applied to the input terminal of the transmission gate 16, the output signal from the terminal 76 is applied to the input terminal of the transmission gate 20 of the gate-circuits $19X_1-19X_4$ of the driving circuit 19, and the output signal from the terminal 77 is applied to the input terminal of the transmission gate 21. The input signal is amplified to "3VD" voltage by receiving that level voltage supply from the voltage supplying circuit 78 via the amplifiers 14a - 14g, 23A - 23D, 55, 66, 72 and 73. The voltage supplying circuit 78 is the booster circuit for boosting the voltage to twice or three times whereby the voltages "OVD", "IVD", "2VD", "3VD" are obtained.

Referring now to the operation of the present embodiment:

The one output of the counter 5 is generated at 10 minutes, the reset pulse having the pulse width corresponding to the delay time of the inverter 33 is generated from the AND-circuit 36 of the control circuit 31, and the dividing circuits 43 - 46 are reset by said reset pulse. When the reset pulse is generated from said AND-circuit 36, the control pulse having the pulse width corresponding to the delay time of the inverters 33 - 35 is generated from the NAND-circuit. Said control pulse is [0], and said temperature detecting circuit 37 oscillates only during the term corresponding to the pulse width. Said pulse width of the control pulse is longer than the pulse width of said reset pulse whereby the temperature detecting circuit is operated after the stoppage of the reset pulse. Said control circuit 31 is composed of the AND-circuit, NAND-circuit and inverter, however, it is possible to construct the control circuit 31 by employing other circuits, for example a multi vibrator and latch circuit.

Figure 5:
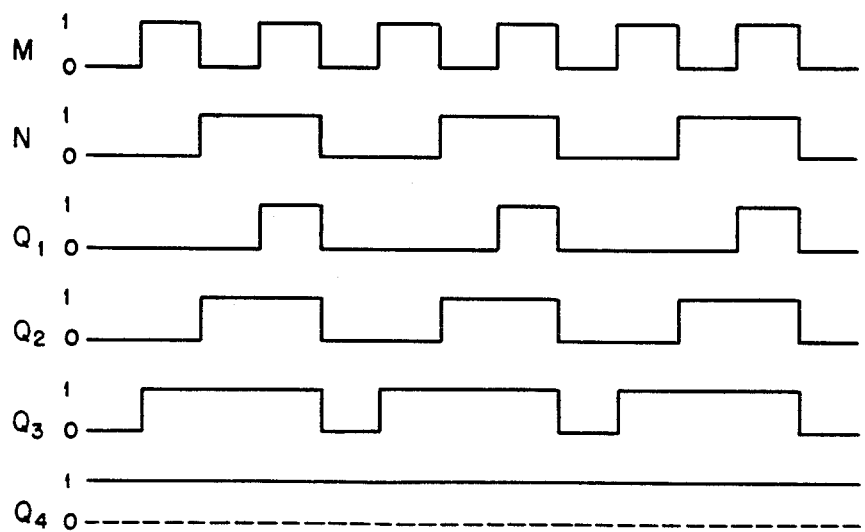
FIG. 5 is the waveshape of the signal derived from the selecting circuit in FIG. 2.

The oscillating signal of the temperature detecting circuit 37 is applied to the dividing circuits 43 - 46 of being the counting circuit for counting the pulse of generated in the operating term of said temperature detecting circuit 37. When the ambient temperature is low, the oscillating frequency of the temperature detecting circuit 37 is high whereby the dividing circuits 45 or 46 are changed during the oscillating term. When the ambient temperature is high, the oscillating frequency of the temperature detecting circuit 37 is low whereby the change of output occurs in only the dividing circuits 43 or 44. It is necessary to set the pulse width of the control signal generated from the NAND-circuit 32 of the control circuit 31 namely the operating term of the temperature detecting circuit 37, the oscillating frequency of the temperature detecting circuit 37 and the dividing ratio of the dividing circuits 43-46 for eliminating the overflow of the dividing circuits 43-46 at the minimum lower temperature. Signals M and N are shown in FIG. 5, the output signal of the selecting circuit 47 namely the output signal of the OR-circuit 53 has the period equal to the signal N and has the pulse of ¼ duty ratio during the signal generated from the dividing circuit 43. Further the output of the dividing circuit 44 is changed, and becomes a [1] signal whereby the output signal of OR-circuit 53 becomes the pulse equal to the signal N as indicated in the wave shape $Q_2$. In said condition, the output is the same whether the output of the dividing circuit is [0] or [1]. When the output becomes [1] by the change of the dividing circuit 4, the output signal of the OR-circuit 53 becomes the pulse equal to the period of the signal N having ⅜ duty ratio as indicated as the wave shape $Q_3$. When the ambient temperature is low whereby the output becomes [1], the continuous signal of [1] is generated from the OR-circuit 53 as indicated the wave shape $Q_4$. When the ambient temperature is high whereby the output is not generated in the dividing circuits 43-46, the signal equal to the wave shape $Q_1$ is generated from the OR-circuit 53.

Figure 6:
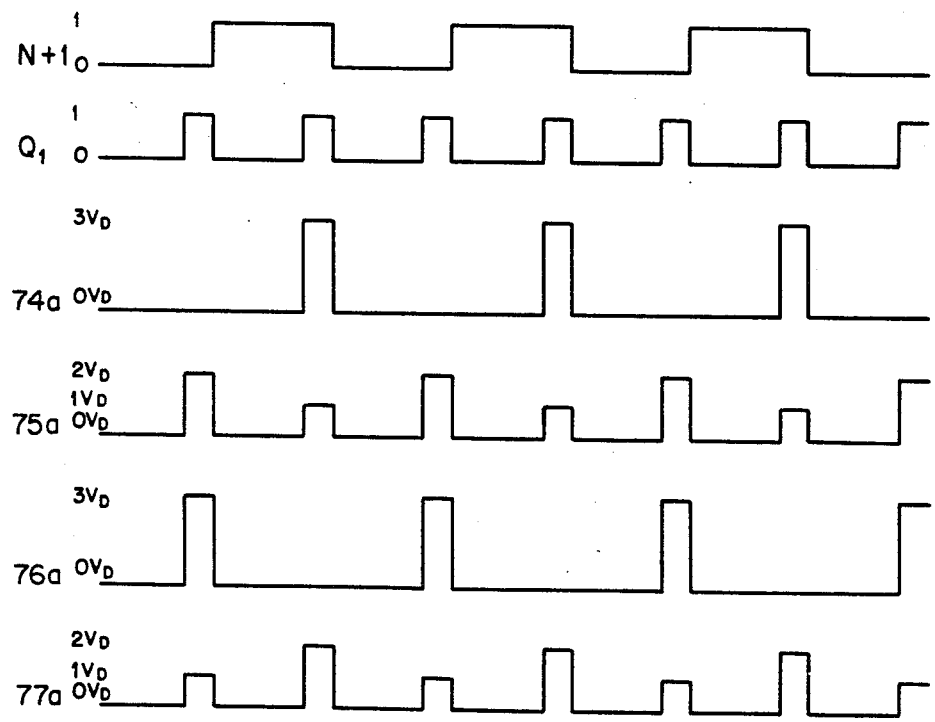
FIG. 6 is the waveshape of the signal derived from the output terminal of the driving control circuit in FIG. 2.

The signals $Q_1-Q_4$ having different duty ratio according to the ambient temperature are selectively generated from the selecting circuit 47, and are applied to the driving control circuit 54. For example in case of generating the signal $Q_1$ from the selecting circuit 47, the signals indicated as 74a-77a in FIG. 6 are generated at the terminals 74-77 of the driving control circuit 54. In FIG. 6, N+1 is the wave shape of the dividing signal N+1, $Q_1$ is the same signal wave shape as indicated in FIG. 5. Namely, the pulses having "1VD" and "2VD" voltage and the pulse width equal to the pulse width of the signal generated from the selecting circuit 47 are alternately generated from the terminals 75 and 77, the pulse having "3VD" voltage equal to the pulse width the signal $Q_1$ and equal to the period of the signal N+1 is generated from the terminals 74 and 77.

Figure 7:
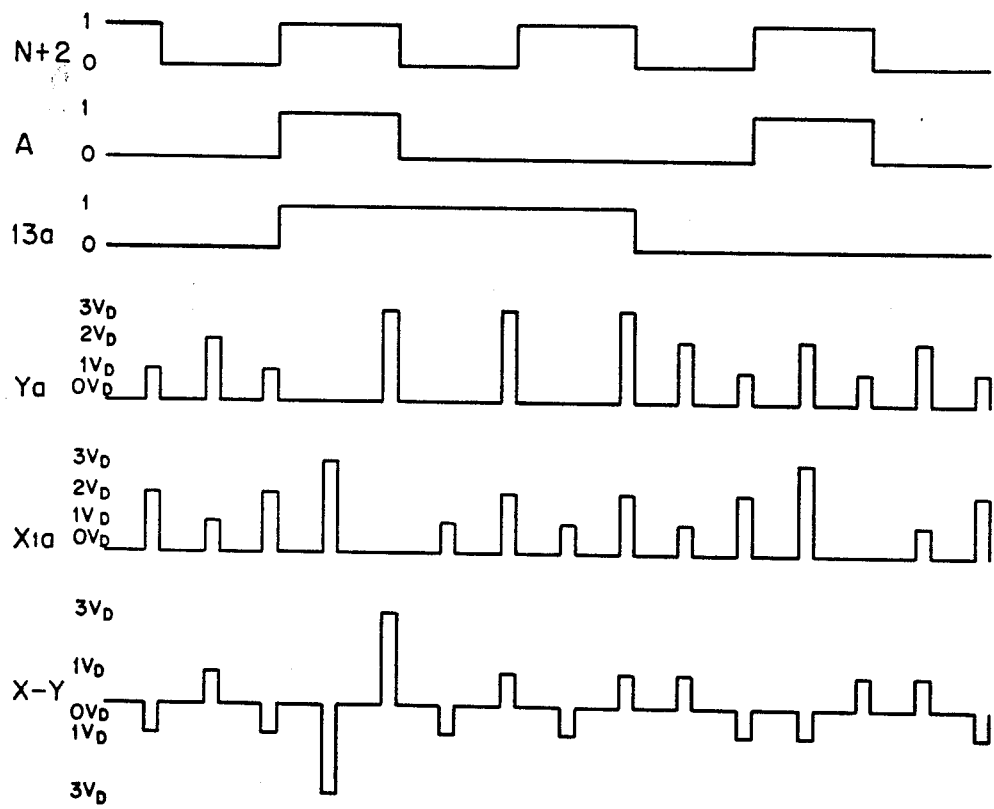
FIG. 7 is the waveshape of the voltage applied at the segment electrodes and the figure electrodes of the liquid crystal display device in FIG. 2.

When the signals as indicated in FIG. 6 are generated from the terminals 74-77, the voltage applied to the segment a and figure electrode $X_1$ is changed by the output signal to the segment a of the decoder 13 and the gate control signal A from the gate control circuit 24 as indicated in FIG. 7. In FIG. 7, N+2 is the wave shape of the dividing signal N+2, A is the wave shape of the gate control signal A generated from the gate control circuit 24, 13a is the wave shape for indicating the output signal of the decoder 13 to the segment a, Ya is the voltage wave shape applied to the segment a, $X_{1a}$ is the voltage wave shape applied to the figure electrode $X_1$, X-Y is the wave shape for indicating the difference of voltage between the segment a and figure electrode $X_1$. When the output signal and gate control signal of the decoder 13 are not generated, 1VD voltage pulse is applied between the segment a and figure electrode $X_1$, and liquid crystal display device LC is not operated. On the contrary, when the output signal and the gate control signal A from the decoder 13 is generated, 3VD voltage pulse is applied between the segment a and figure electrode $X_1$, whereby said liquid crystal display device LC is operated.

FIG. 6 and 7 shows the wave shape in case of the signal $Q_1$ in FIG. 5 is generated from the selecting circuit 47, where the duty ratio of the driving pulse of the liquid crystal display device LC is set to ¼.

Figure 8:
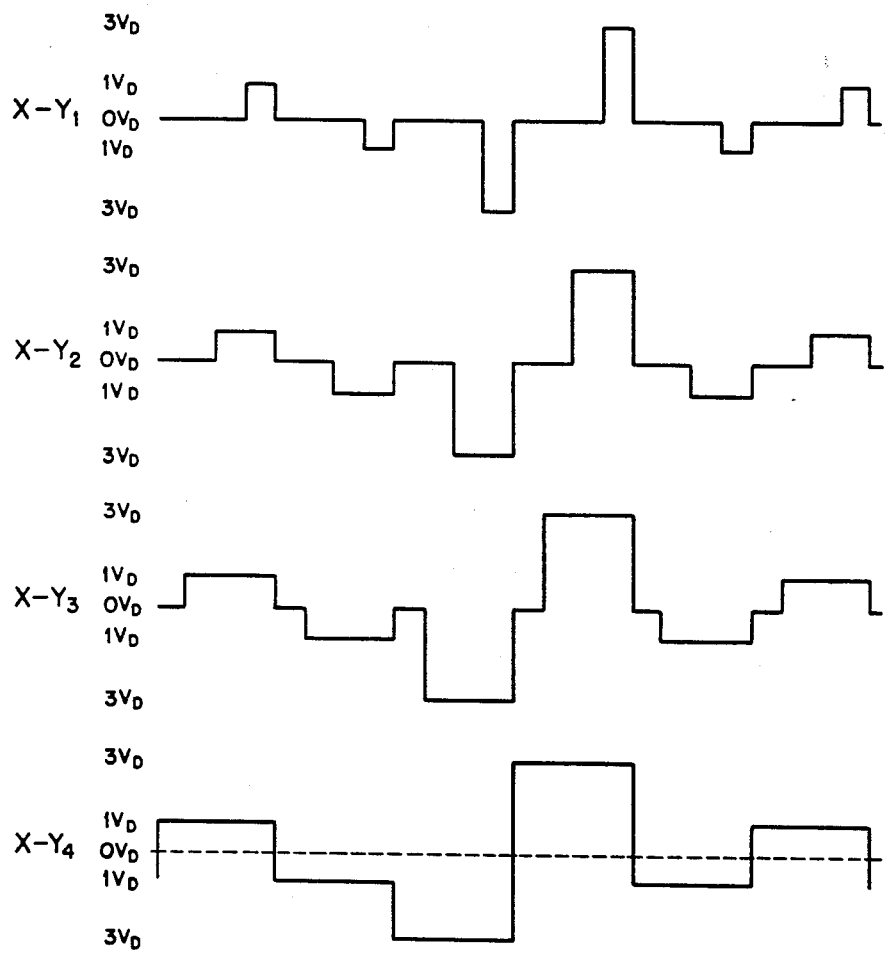
FIG. 8 is the waveshape for indicating the changing condition of the driving time width for driving the liquid crystal display device according to the change of an ambient temperature.

FIG. 8 shows the wave shape for indicating the change of the driving pulse of said liquid crystal display device LC in the case the signal generated from the selecting circuit 47, X-$Y_1$ is the driving pulse wave shape for indicating the signal $Q_1$, X - $Y_2$ is the driving pulse wave shape for indicating the signal $Q_2$, $X - Y_3$ is the driving pulse wave shape for indicating the signal $Q_3$, $X - Y_4$ is the driving pulse wave shape for indicating the signal $Q_4$. According to FIG. 8, the signals $Q_1$, $Q_2$, $Q_3$ and $Q_4$ generated from the selecting circuit 47 are changed whereby the duty ratio of the driving pulse of the liquid crystal display device LC is changed as ¼, ½, ¾ and 1. Namely when the ambient temperature is high and the oscillating frequency of the temperature detecting circuit 37 is low and the output of the dividing circuit 43 is changed, the duty ratio of the driving pulse is ¼. On the contrary, when the ambient temperature is low and the oscillating frequency of the temperature detecting circuit 37 is high and the output change occurs at the dividing circuit 45, the duty ratio of the driving pulse becomes ¾, therefore the driving time width of the liquid crystal display device LC is changed in the low temperature and the high temperature. Accordingly the driving time width in the low temperature becomes longer than the high temperature condition whereby the actual driving power is increased and the delay of the response speed is compensated. On the contrary, the driving time width in the high temperature becomes shorter than the low temperature condition whereby the actual driving power is descreased and the occurance of the cross-talk is prevented and a good contrast condition in the wide temperature is obtained.

Figure 1:
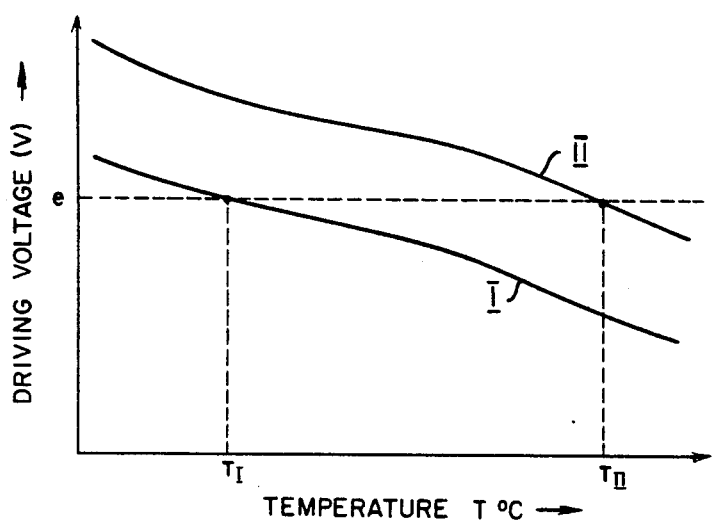
FIG. 1 illustrates the temperature characteristics of the display element used in the display device according to the present invention.
Figure 9:
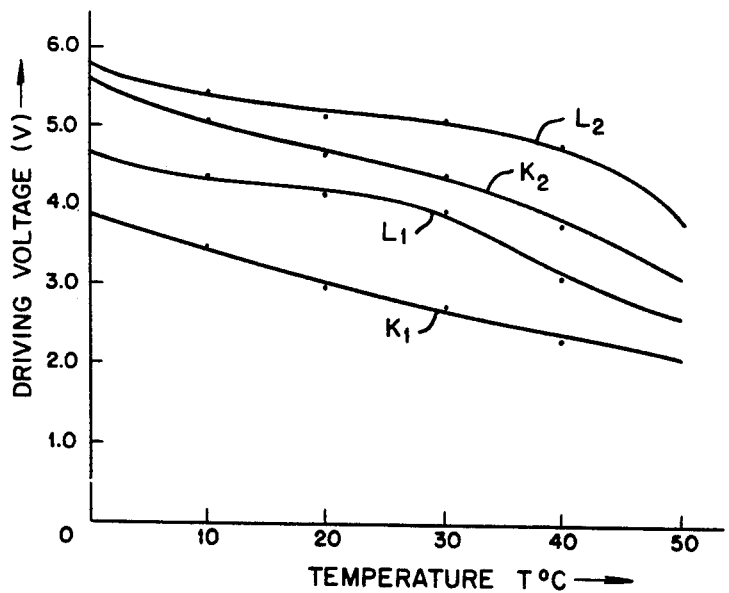
FIG. 9 illustrates the temperature-driving voltage characteristics in a temperature compensated display.

Referring now to the temperature compensation for the display element by the change of the driving time width accompanying drawings in which:

FIG. 9 shows the curved line for indicating the change condition of the driving voltage and range of the display element.

The curved line $K_1$ shows the limit line for indicating the impossibility of displaying the display element at less than the predetermined voltage with duty ratio 1 of the driving pulse to the display element, and the curved line $k_2$ shows the limit line for indicating the limit of generating cross-talk to the display element in case of applying a voltage higher than the predetermined level. The curved line $L_1$ shows the limit line for indicating the impossibility of displaying the display element at less than the predetermined voltage with duty ratio 0.5, the curved line $L_2$ shows the limit line for indicating the limit of generating cross-talk to the display in case of applying a voltage higher than the predetermined level.

According to the result of experiment, at the duty ratio 1, a good contrast is obtained in the temperature range of 0°-20° C in case of driving the display element by the driving voltage 4.5V, however cross-talk occurs above 20° C. In case of operating in a wide temperature range with a constant driving voltage 4.5V, it is necessary to set the duty ratio to 0.5 above 20° C whereby it is possible to display until 45° C. Further it is possible to display the display element in a higher temperature by setting a smaller duty ratio than the above noted level.

Figure 10:
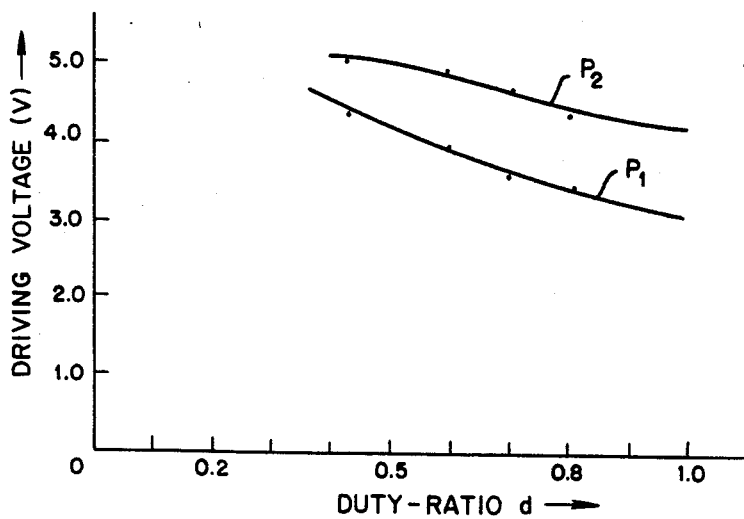
FIG. 10 illustrates the relation between the duty-ratio to the driving voltage in a temperature compensated display.

FIG. 10 is a curved line graph showing the relation of the driving voltage to the variation of the duty ratio at normal temperature. The curved line $P_1$ is the line showing the limit driving voltage at which the display terminates, in case of changing the duty-ratio. And the curved line $P_2$ is the line showing the limit driving voltage at which display cross-talk produced, in case of changing the duty-ratio.

As understood from the result of the experiment showing in FIG. 9 and FIG. 10, it is apparent that the change of the duty-ratio of the driving pulse according to changes of ambient temperature is effective to provide temperature-compensation of the display element, namely the change of the driving time width is equivalent to change of the driving voltage.

The details of the display device being an embodiment of this invention are merely illustrative, the spirit of this invention includes not only the described embodiment but also variations thereof. For example, in this embodiment, this display device is constructed so that the oscillating frequency becomes high at the low temperature by employing the positive thermistor as the temperature element of the temperature detecting circuit.

However, this display device may be constructed so that the oscillating frequency becomes low at the low temperature by employing a general thermistor. In this case, the selecting circuit suitable to the general thermistor needs to be designed.

In accordance with this invention, the dividing circuit which detects the oscillating frequency of the temperature detecting circuit, is the counting circuit.

Also, in accordance with this invention, the temperature detecting circuit operates at the predetermined duration at intervals of 10 minutes.

However, the temperature detecting circuit may operate at intervals of one minute or one hour.

In accordance with this display device of this invention, the driving time width of the display element in response to the variation of the ambient temperature is changed automatically, whereby the retarding of the response velocity at the low temperature and the advancing of the response velocity at the high temperature may be compensated and also the display having good contrast is made even in a broad variation of the ambient temperature. Further, power dissipation is low. Namely, since the display element has a non biased time, the display device of this invention uses electric power effectively and this is able to extend the life time thereof.

Accordingly, the object of this invention is obtained and the effect of this invention is very good in practice.

I claim:

1. A temperature compensated time display device comprising in combination:
   oscillator means for developing an oscillatory high frequency time standard signal;
   counter and decoder means responsive to the time standard signal for developing periodic signals representative of time;
   display means operable in a multiplex mode by driving signals for displaying time in response to the counter and decoder means output signals representaive of time;
   temperature detecting means responsive to an output signal developed by said counter and decoder means for periodically developing an oscillatory signal having a frequency representative of ambient temperature;
   a divider circuit connected to receive the oscillatory signal representative of ambient temperature for dividing the same;
   selecting circuit means responsive to the divided signal representative of ambient temperature and to an output signal of said counter and decoder means for developing an oscillatory drive signal in synchronism with said output signal of said decoder and counter means and having a duty cycle representative of ambient temperature;

a voltage supply circuit for supplying a plurality of different value voltages; and drive control means receptive of the voltages developed by said voltage supply circuit and responsive to the output signal of said selecting circuit means for driving said display means in a multiplex mode with the voltages developed by said voltage supply circuit at duty cycles corresponding to the duty cycles of said selecting circuit means output signal in order to display time represented by said counter and decoder means output signals;

whereby variations in driving voltages applied to said display means compensate for ambient temperature variations, and this compensation is adjusted periodically under control of said periodic output signal developed by said counter and decoder means and applied to said temperature detecting means.

2. A display device according to claim 1, wherein said temperature detecting means comprises:

an oscillator circuit responsive to a control signal for developing an oscillatory output signal having a frequency representative of ambient temperature which is received by said divider circuit; and control means receptive of said signal developed by said counter and decoder means for developing a reset signal to reset said divider circuit and thereafter develop a control pulse to enable said oscillator to develop an output signal having a frequency representative of ambient temperature for the duration of said control pulse.

* * * * *